United States Patent [19]
Wetmore

[11] 3,758,916
[45] Sept. 18, 1973

[54] HEAT RECOVERABLE ARTICLE AND PROCESS
[75] Inventor: Judson Douglas Wetmore, San Mateo, Calif.
[73] Assignee: Raychem Corporation, Menlo Park, Calif.
[22] Filed: Dec. 6, 1972
[21] Appl. No.: 312,702

Related U.S. Application Data
[63] Continuation of Ser. No. 812,789, April 2, 1969.

[52] U.S. Cl. .................. 16/2, 174/152 R, 264/321, 264/345
[51] Int. Cl.... F16l 11/10, H01b 17/26, B29d 27/00
[58] Field of Search .................... 16/2, 108; 248/22; 161/161; 174/83, 152 R, 152 G, 167; 264/321, 345

[56] References Cited
UNITED STATES PATENTS
3,022,482   2/1962   Waterfield et al. ...... 174/152 R UX
3,277,525   10/1966  Buschman et al. ............. 264/345 X
3,363,870   1/1968   Olson.............................. 16/108 X
3,420,363   1/1969   Blickensderfer................ 264/321 X
3,449,477   6/1969   Logomasini..................... 161/161 X
3,130,260   4/1964   Gray .............................. 174/152 R Primary Examiner—Donald A. Griffin
Attorney—Robert M. Taylor, Jr. et al.

[57] ABSTRACT

A heat recoverable article having intersticed walls, the interstices being filled with a compressible fluid so that the wall thickness of the article can be varied without appreciably varying the length of the article, together with the process of making such articles.

6 Claims, 15 Drawing Figures

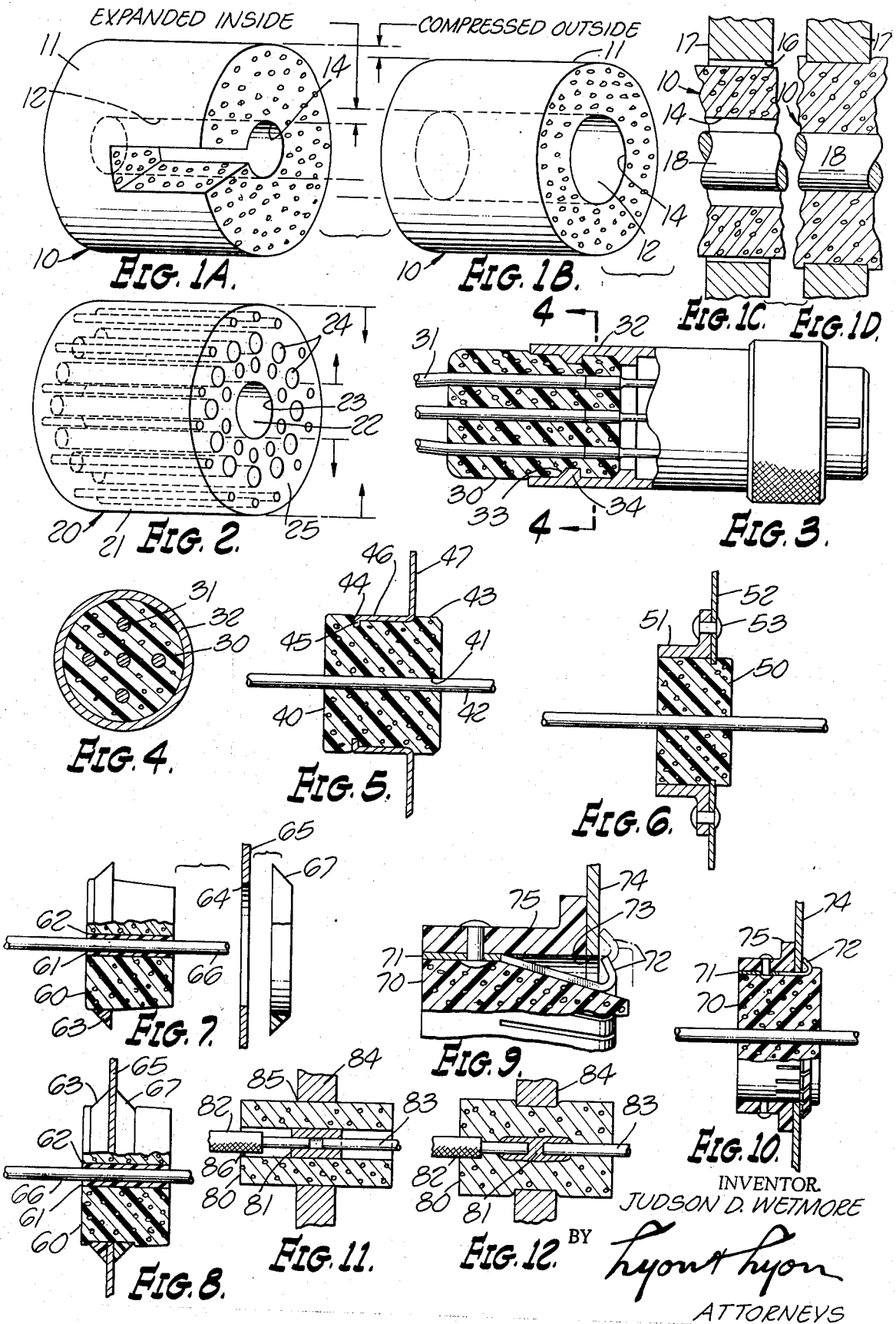

HEAT RECOVERABLE ARTICLE AND PROCESS

This is a continuation, of application Ser. No. 812,789, filed Apr. 2, 1969.

BACKGROUND OF THE INVENTION

Many commercial articles are now available that are constructed of material having the property of elastic or plastic memory. Examples of such articles and the materials of which they are made may be found in U.S. Pat. Nos. 2,027,962, 3,086,242 and 3,243,211, the disclosures of which are incorporated herein by reference. Such articles are generally manufactured in the form of extended hollow cylindrical tubes and sleevings and in the form of molded parts. They are used in the fields of electrical insulation, wire and cable terminations, feed-through assemblies, pipe linings, identification sleeves, and many other applications. The principal feature of these articles, and the basis of their commercial desirability, is their capability of being fabricated in one size and shape and then purposely distorted under controlled conditions and "frozen" in the distorted shape. Subsequent heating permits the distorted article to attempt to return to its initial fabricated size and shape.

As disclosed in the aforementioned U.S. Pat. No. 3,086,242, one method of producing heat recoverable products comprises fabricating a suitable material into the final desired shape and size and then crosslinking the material in this configuration. The crosslinking can be accomplished by the use of high energy radiation or by chemical crosslinking techniques. Once the material has been crosslinked, whether by high energy radiation or chemical means, or a combination of the two, the material is locked into the desired final configuration. When the material is maintained at a sufficiently high temperature to allow distortion, the product can be changed in dimension by the application of forces and then quenched or cooled to permit the crystals to reform to retain the product in its distorted form while at room temperature. The reheating of the article to a temperature sufficient to melt the crystals will allow the crosslinks to quickly return the product to its initial size and shape.

The use of presently available heat recoverable articles has not been possible in many applications because the material from which they are made is non-compressible and therefore a change in one dimension cannot be accomplished without a corresponding change in another dimension. For example, if a simple hollow cylindrical tube is increased in diameter and its length controlled to remain constant, then the well thickness of the tubing must obey the laws of the conservation of matter for non-compressible materials and become thinner. This prohibits the use of heat recoverable items for those applications where control of all three dimensions, i.e., diameter, length and wall thickness, is necessary. For example, it is often necessary to insulate a wire termination or a series of wires as joined into a connector. The insulated wires leading to the connector must be stripped and soldered or mechanically joined to the pins in the connector and then the bared portions of the wires and pins must be insulated. A convenient method of doing this would be by the use of a molded plastic or rubber body which would have holes large enough to accommodate the wires including the insulation and yet whose outside diameter would be small enough to permit the body to fit inside of the connector outer shell. This can be accomplished with non-compressible materials in a heat recoverable article only by extending the length. In other words, the inside holes can be expanded and the outside diameter reduced only when the length of the body is sustantially increased. This, however, does not permit a reliable recovery because of the probability of the shrinkage in length accompanying the increase in outside diameter and the decrease of the hole sizes causing interference and stopping the desired complete recovery. If a product could remain substantially the same in length while increasing in outside diameter and at the same time shrinking at each hole, a reliable termination insulation could be accomplished.

SUMMARY OF THE INVENTION

It has been discovered that the desired control of all dimensions of a heat recoverable article can be accomplished, e.g., by fabricating the article of material into which has been incorporated a compressible fluid such as air, nitrogen, carbon dioxide, etc. Several methods of control introduction of such compressible fluids into heat recoverable materials have been discovered. One such method includes the use of a foamed thermoplastic material followed by crosslinking and then distortion. Subsequent reheating will allow the foam to attempt to recover to its initial dimensions. Another method which has been found to be successful is the use of solid heat recoverable materials into which have been drilled or molded holes or air spaces which will act as compressible portions of the formerly solid material. By thus providing the heat recoverable material with a plurality of voids, members can be made which can be distorted so as to have a changed wall thickness and changed transverse dimensions without substantially changing the longitudinal dimension of the member.

For purposes of clarity and convenience, the term "intersticed" will be used herein to denote, and is intended to include, both materials that are foamlike in nature and materials which are solid but have a plurality of holes drilled, molded or otherwise fashioned therein. Similarly, the term "interstice" is used herein to denote and include both the voids formed by foaming a material and those formed by drilling, molding and the like. Also, the term "longitudinal dimension" will be used herein to denote the dimension of a heat recoverable article which is to be maintained constant during distortion and recovery while the term "lateral dimension" will be used to denote the dimension of distortion and recovery.

As used herein, "heat recoverable" articles are those which are dimensionally heat unstable and are capable of assuming a predetermined configuration and heat stable condition upon the application of heat alone.

Preferably, the heat recoverable members to be described comprise a polymeric material having the property of elastic memory such as those disclosed in U.S. Pat. No. 3,086,242. Among such suitable polymers are polyolefins such as polyethylene, polypropylene and olefin copolymers and olefins with other unsaturated monomers, polyamides, polyurethanes, polyvinylchloride, polyvinylidenefluoride, ionomers, and elastomeric materials such as those disclosed in copending application Ser. No. 65,953, filed Oct. 31, 1960, the disclosure of which is incorporated by reference herein. The property of elastic memory may also be imparted to materials having the properties of crosslinked polymers such as polytetrafluoroethylene and polyolefins or vinyl polymers which have a molecular weight which is sufficiently high to give the polymer appreciable strength at temperatures above the crystalline melting point.

BRIEF DESCRIPTION OF THE DRAWINGS

FIGS. 1A and 1B are perspective views showing a first embodiment of the present invention in its initial and distorted states respectively;

FIGS. 1C and 1D are sectional views of the embodiment of FIGS. 1A and 1B in a typical installation before and after recovery;

FIG. 2 is a perspective view showing a section embodiment of the present invention;

FIG. 3 is a side elevation, partly in section, showing a modification of the first embodiment of the present invention;

FIG. 4 is a cross-sectional view taken along lines 4—4 of FIG. 3;

FIG. 5 is a cross-sectional view of another modification of the first embodiment of the present invention;

FIG. 6 is yet another modification of the first embodiment of the present invention;

FIG. 7 is an exploded view showing a still further modification of the first embodiment of the present invention;

FIG. 8 is a side elevation, partly in section, of the modification shown in FIG. 7 with the elements thereof in their assembled relationship;

FIG. 9 is a sectional view of another modification of the embodiment of FIG. 1;

FIG. 10 is a sectional view of the modification of FIG. 9 as installed;

FIG. 11 is a sectional view of a further modification of the embodiment of FIG. 1; and FIG. 12 is a sectional view of the modification of FIG. 11 after its installation.

DESCRIPTION OF THE INVENTION

Turning now to the drawing, FIG. 1A shows a first embodiment of the present invention in its initial or as fabricated state. In this embodiment a hollow tubular member 10 has an outer peripheral surface 11 and an inner surface 12 formed by a passageway 14. The member 10 can be formed by extrusion or it can be molded in the shape shown. The member 10 is constructed of a foamed material which is capable of having the property of plastic or elastic memory imparted thereto. This material may be any of the materials disclosed in the aforementioned patents which is caused to be foamed during its extruding or molding.

In the preferred embodiment of the present invention, after the member 10 is formed, it is crosslinked, and then the diameter of the passageway 14, or the inside diameter, is expanded while the outside diameter of the member is reduced by conventional techniques and the length of the member is maintained constant by the use of suitable end pieces. The changing of the radial dimensions of the member 10 is preferably accomplished while the member is heated to an elevated temperature, which, in the case of a crystalline material such as those disclosed in U.S. Pat. No. 3,086,242, is the crystalline melting point of the material. The member is then cooled while still constricted with the result that the member will remain in its distorted form, that is, with an increased inside diameter and a decreased outside diameter. The member so formed is shown in FIG. 1B.

The member shown in FIG. 1B may be used in any of a plurality of applications where it is desired to pass an object, for example, an insulated electrical conductor, through an opening or aperture in a wall of any kind, while at the same time sealing the opening. An example of this is shown in FIGS. 1C and 1D. In FIG. 1C, a member such as the member 10 is inserted in a hole or aperture 16 in a wall 17. A wire 18 is passed through the passageway 14 in the member 10. The member 10 is now heated to above its recovery temperature with the result that the diameter of the passageway 14 begins to reduce to its original diameter while the outside diameter of the member begins to expand towards its original diameter. As a result of this recovery, the member 10 will firmly engage both the wire 18 and the wall 17 with the result that the wire 18 will be held in place and the hole 16 in the wall 17 will be sealed. The recovered position of the member 10 is shown in FIG. 1D. If desired, a suitable adhesive or sealant may be applied to the outer surface of the member or the passageway therein to assist in forming a seal between the wire and the member and the member and the wall.

FIG. 2 shows another embodiment of the present invention. In this embodiment, a member 20 is formed of solid material capable of having the property of plastic or elastic memory imparted thereto and is tubular in shape, having an outer surface 21 and an inner surface 22 formed by an axial passageway 23. The member 20 can be extruded or molded as desired. After the member is formed, it is crosslinked and a plurality of longitudinal holes or passageways 24 are then drilled or molded in the wall 25 to provide this wall with an intersticed structure. The member 20 is then heated to above its recovery temperature and the diameter of the passageway 23 expanded while the outside diameter of the member 20 is reduced in the same manner as was done in connection with the embodiment of FIG. 1. The member is then allowed to cool while distroted.

The member shown in FIG. 2 has many uses and in many applications can be used interchangeably with the member shown in FIG. 1. Of course, if a seal is required, the holes 24 cannot extend axially along the entire length of the member 20. The length of the holes can, however, be staggered in length and the holes may be in great enough number so that the wall 25 is still sufficiently compressible for the purposes of the present invention without providing any continuous passageway from one end of the member to the other except, of course, the central passageway 23.

An example of the fabrication of a member such as that shown in FIG. 2 is as follows. A piece of polyethylene containing carbon black was molded and chemically crosslinked to from a member having an inside diameter of 0.413 inches and an outside diameter of 0.962 inches. The length of the member varied from 0.479 inches along one side to 0.487 inches along the other side. A plurality of holes having diameters of 0.1 and 0.05 inches were drilled longitudinally in the wall 25. The member was then heated to 250° C. and forced over a tapered mandrel to increase the inside diameter of 0.492 inches. The member was then forced into a sleeve with a tapering inner hole which ended in a section with a diameter of 0.886 inches. The member was then allowed to cool, removed from the sleeve and the mandrel was then removed. The length of the distorted member was 0.497 inches on one side and 0.488 inches on the other. The member was then recovered by heating it to its heat recovery temperature. After full recovery, the inside diameter was 0.413 inches, the outside diameter 0.962 inches. The length varied from 0.476 inches on one side to 0.489 inches on the other. It can thus be seen that the member permits distortion and recovery of its inside and outside diameters without any appreciable effect on its length.

In FIGS. 3 and 4, there is shown a modification of the embodiment of the invention shown in FIG. 1. In these figures, a member 30, formed in the same manner as the member 10 of FIG. 1, is used as a connector back seal in place of potting or compression fittings of elastic material. The member 30 is provided with a plurality of longitudinal passageways in place of the single axial passageway shown in the member 10. As originally formed, each of the passageways has a diameter less than the diameter of the wires 31 with which the member is to be used, and the outside diameter of the member 30 is greater than the diameter of the connector shell 32 into which it will be inserted. In the manner discussed in connection with FIGS. 1, the member 30 is distorted so that each of the longitudinal passageways is provided with a diameter greater than the diameter of the wires 31 while the external diameter of the member is reduced to less than that of the internal diameter of the connector shell 32. If desired, the member 30 can be provided with an annular recess 33 for cooperating with an annular shoulder 34 formed on the shell 32.

After the wires 31 have been passed through the longitudinal passageways in the member 30, it is inserted into the shell 32 and then heated to above its recovery temperature. As a result of being so heated, the diameter of the longitudinal passageways will recover toward their original diameters while the external diameter of the member 30 will recover towards its original diameter. Consequently, the wires 31 will be firmly grasped by the member 30 as will the internal surface of the shell 32. The annular recess 33 cooperates with the shoulder 34 to form a lock to add greater strength to the seal.

FIG. 5 shows a modification of the member shown in FIG. 1 which may be used, for example, as a bulkhead feedthrough. In this figure, a member 40 has a central passageway 41 through which can be passed a wire 42. The initial and recovered diameter of the opening 41 is, of course, less than the diameter of the wire 42. The periphery 43 of the member 40 is provided with a groove 44 for cooperating with the turned down end 45 of flange 46 formed on the wall or bulkhead 47 through which the wire 42 is to be passed. As was the case with the previous figures, the member 40 is distorted so that its outside diameter is less than the opening through which it is to be passed. Upon recovery, the member expands to tightly engage the flange 46 and is further held in position by the end 45 of this flange.

It should be understood that the member 40, like the members 10 and 20, and like the members to be described hereafter, is described as having a circular cross-section with holes or passageways of circular cross-section formed herein. This description is illustrative only. The various members and holes may just as well take other forms, for example, they may be square or rectangular. These and other forms can be distorted both as to their outer lateral dimension, the outside diameter in the case of the members shown, and in their internal lateral dimension, that is, the dimensions of the holes or passageways formed therein. It should also be understood that while the member 40, like the member 30, and like the members to be described hereinafter, are shown to be formed of foamed material like that used in forming the member 10 of FIG. 1, they can also be formed of solid material having holes drilled or molded therein as described in connection with the member 20 of FIG. 2.

FIG. 6 shows another embodiment of a bulkhead feedthrough. In this figure, a member 50 of foamed material similar to that of the member 10 is positioned within an outer flanged shell 51. This shell is first mounted on the bulkhead or wall 52 by means of screws or rivets 53 and the member 50 then expanded into the shell. The shell serves to increase the mechanical strength of the assembly, the member 50 accomplishing sealing in the same manner as described previously.

FIG. 7 shows a still further modification of the member shown in FIG. 1. In this figure, a member 60 formed of a foamed material having the property of plastic or elastic memory is heated and distorted to the desired shape and a tubing or liner 61 of heat recoverable material which has been distorted to a desired diameter is inserted in the central passageway 62 of the member 60. The tubing 61 may, if desired, be replaced by any suitable fusible material, such as a suitable adhesive, as disclosed in my patent No. 3,243,211 or a material such as a suitable grease, as disclosed in my patent No. 3,297,819, the disclosure of which is incorporated by reference herein. An adhesive may also be provided on the outer curved surface of the member 60.

A ring 63 of heat recoverable material which has been distorted to greater than its initial diameter is then telescoped over one end of the member 60. The outer end of the member 60 is tapered downward from its original size to a diameter somewhat smaller than the hole in which it is to be inserted, for example, the hole 64 in the plate 65.

After a wire 66 has been passed through the tubing 61 positioned in the enlarged hole 62, the entire assembly is pushed through the hole 64 until the ring 63 engages the wall or bulkhead 65. Another ring 67 of a heat recoverable material which has been expanded beyond its initial diameter is then slipped over the tapered end of the member 60 and brought into engagement with the other side of the wall 65. The whole assembly is then heated to above the recovery temperature of the various materials with the result that the tubing 61 and the inner diameter of the passageway 62 will contract to firmly grasp the wire 66 while the outer diameter of the member 60 will expand. The rings 63 and 67 will attempt to contract towards their initial diameters. The member 60 will form a seal with the rings 63 and 67 and expand beyond them, thereby locking the assembly into the hold and effecting a seal as shown in FIG. 8.

FIGS. 9 and 10 show a still further modification of the manner in which a member constructed in accordance with the present invention can be used as a bulkhead feedthrough. In these figures, a member 70 of foamed material similar to that of the member 10 is positioned within a locking ring 71 which is slotted to provide a plurality of hooked fingers 72 which are bent inwardly sufficiently to permit entrance into and through a hole 73 formed in a wall or bulkhead 74. The locking ring 71 is preferably riveted or otherwise attached to a metal or plastic shell 75. When this assembly is positioned in the hole 73 so that the ends of the hooked fingers 72 project beyond the wall 74, and the member 70 is recovered toward its initial size and shape, the hooked fingers 72 are caused to be forced outwardly and engage the wall 74. This will lock the member into the hole. In all other respects, the operation of this modification is similar to those previously described.

FIGS. 11 and 12 show a member 80 constructed in accordance with the present invention used in cooperation with a solder insert 81 such as those disclosed in my aforementioned U.S. Pat. No. 3,243,211. Such a structure is used when it is desired to simultaneously make a soldered electrical connection while sealing a hole through which one of the electrical conductors must pass. For example, it may be desired to make a soldered electrical connection between a wire 82 and a terminal 83 positioned within a shell 84 of an electrical connector and then to seal the hole 85 through which the wire 82 must protrude. This can be accomplished by providing the member 80 with the solder insert 81 in the manner taught in my patent.

As was the case with the previous embodiments of this invention, the outside diameter of the member 80 is less, in the distorted state, than the diameter of the hole 85 while the inside diameter, or the diameter of the passageway 86, is greater than the diameter of the insulated portion of the wire 82. When the assembly is heated above the recovery temperature of the member 80 and above the melting temperature of the solder 81, the member 80 will recover to firmly engage the wall 84, the insulated portion of the wire 82, and the terminal 83. The solder will melt and flow to form a good soldered connection between the conductive portion of wire 82 and the terminal 83 in the manner taught in my patent. When used in connection with a solder insert, the member of the present invention must be fabricated with a material which exhibits elastomeric properties when heated to at least its crystalline melting point.

What is claimed is:

1. A heat recoverable article comprising a member having a passageway therethrough, said member comprising intersticed material having the property of elastic memory whereby the lateral dimension of said passageway and the lateral dimension of said member can be altered without substantially changing the longitudinal dimension of said member.

2. The article of claim 1 wherein said member is fabricated of foamed material.

3. The article of claim 1 wherein said member is fabricated of material having holes formed therein.

4. The article of claim 3 wherein said holes are elongated and parallel to said passageway.

5. The heat recoverable article of claim 1 wherein said lateral dimension of said passageway can be altered to decrease and said lateral dimension of said member can be altered to increase.

6. A heat recoverable article comprising a cylindrical member containing at least one passageway therethrough, said passageway being parallel to the longitudinal axis of said cylinder, said member comprising intersticed material having the property of elastic memory imparted thereto whereby the raising of the temperature of said member to its heat recovery temperature causes the lateral dimension of said passageway to decrease and the lateral dimension of said member to increase without substantially changing the longitudinal dimension of said member.

* * * * *